Aug. 15, 1944.　　　G. B. DOREY　　　2,355,783
SHOCK ABSORBER
Filed June 9, 1942
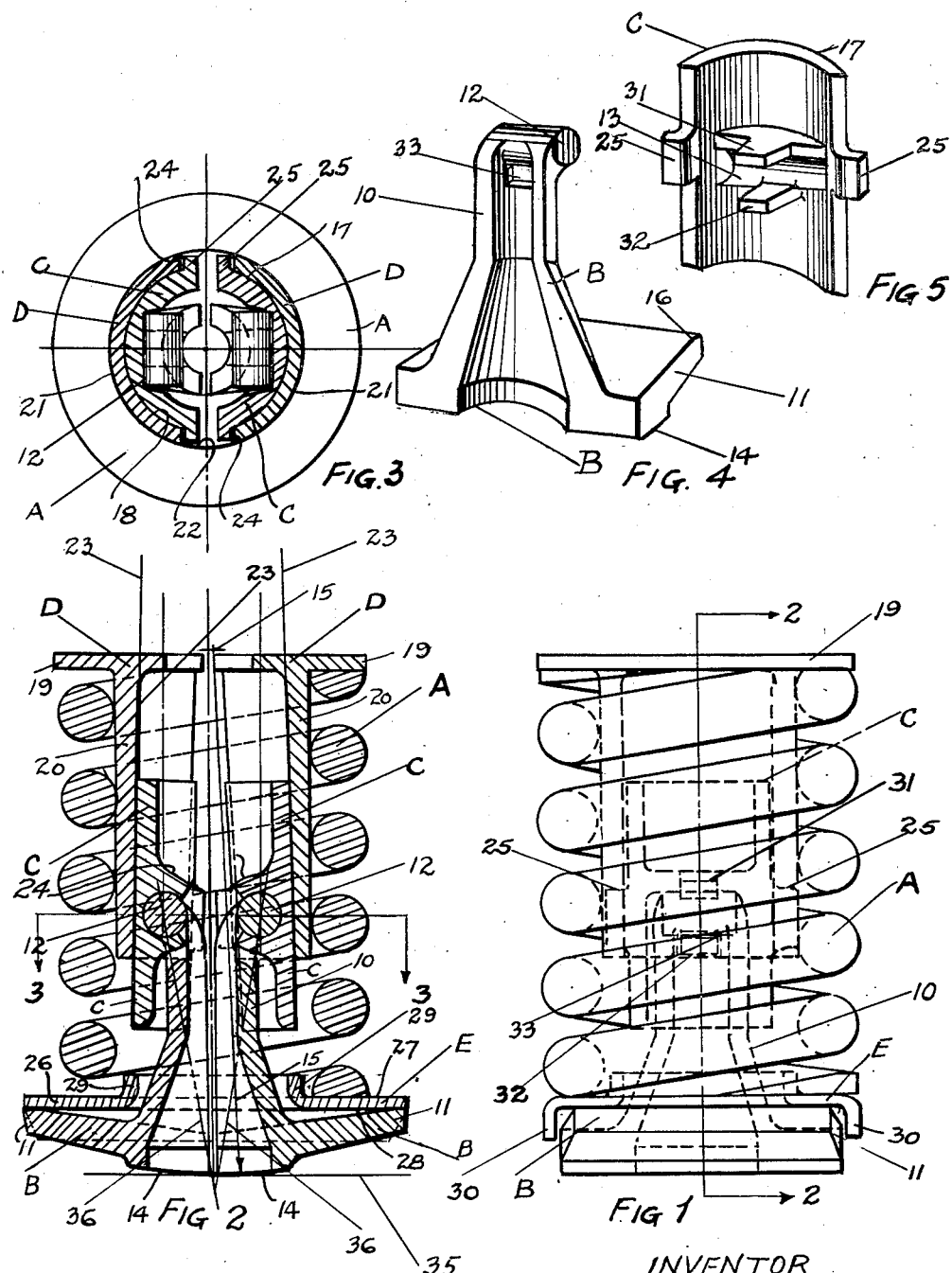
INVENTOR
George Binet Dorey Patented Aug. 15, 1944

2,355,783

UNITED STATES PATENT OFFICE 2,355,783

SHOCK ABSORBER

George Binet Dorey, Westmount, Quebec, Canada

Application June 9, 1942, Serial No. 446,387

8 Claims. (Cl. 267—9)

My invention relates to an improved shock absorber having friction elements in association with a coiled helical spring to dampen excessive oscillations of the spring and to provide means whereby said friction elements will have great shock absorbing capacity and yet be positive in release.

One of the objects of the invention is the provision of an improved shock absorber having a coiled spring and friction elements associated therewith in such a manner that the friction elements will be self alining under all conditions.

A particular object of my invention is to provide a construction wherein the friction elements will engage smoothly throughout the entire range of the travel of the shock absorber and wherein the degree of friction between the various elements will be definitely regulated by the spring pressure.

A further object of my invention is to provide a shock absorber having the wearing parts formed of cheap and readily obtainable materials.

Other advantages of the invention will appear from the following description taken from the accompanying drawing in which:

Fig. 1 is a side elevational view of my improved shock absorber.

Fig. 2 is a vertical transverse sectional view of the structure shown in Fig. 1 and as viewed on a line 2—2 of said Fig. 1.

Fig. 3 is a horizontal sectional view taken on a line 3—3 of Fig. 2.

Fig. 4 is a perspective view of one of the bell crank friction levers.

Fig. 5 is a perspective view of one of the friction shoes.

My invention is shown, by way of illustration, as applied in connection with a helical spring of the type usually employed in railway car trucks and the like.

Referring now to the drawing, my improved construction includes a coiled helical spring A; a pair of bell crank levers B—B; a pair of friction shoes C—C, said shoes being pivotally associated with the bell crank levers for limited pivotal movement; a pair of friction shell members D—D and a bearing plate E.

Each bell crank lever B includes an arm 10 extending within the spring and an arm 11 extending laterally beyond the outer circumference of the spring in order to receive the spring pressure at an appreciable distance from the axial center of the spring and thus assure a positive overbalancing action on each bell crank. The upper portion of the arm 10 is formed with a concentrically shaped section 12 which registers with a similarly curved concave bearing pocket 13 formed on the associated shoe C. The under surface of the bell crank at the end of the shock absorber is curved as at 14 on a large radius 15 about which the bell crank has rocking movement. The center of the radius 15 is preferably located immediately adjacent the axial center of the spring to dispose the bearing contact of the bell crank in such a manner as to provide the longest lateral arm possible. The upper surface of the arm 11 is curved at its outer end as indicated at 16.

Each friction shoe C is preferably in the form of a segment of a cylinder having its outer convex surface 17 engaging a similarly curved concave surface 18 formed on the interior surface of friction shell D.

The pair of friction shells D—D each include a portion in the form of a laterally extending shoulder 19 which engages one end of the spring and a body portion 20 extending within the spring. The body portion 20 is cylindrical in shape in the form of a segment of a circle presenting an exterior surface 21 engaging the inner surface 22 of the spring. The inner surface 18 of each shell D is slightly inclined relatively to the axial center of the spring as indicated at 23 to form a wedge shaped opening or pocket between the pair of shell members, said pocket having its narrowest portion adjacent the end of the spring. The tapered pocket so formed by the inclined walls 23 has the effect of forcing the shoes C—C transversely towards each other as the shock absorber is compressed.

The outer longitudinally extending edges of the shell members D are substantially parallel to the direction of movement of the shoes and said edges 24 constitute guiding means for guiding lugs 25 formed on the shoes C. The lugs 25 serve to maintain the shoes and bell crank levers in a definite axial relation to the friction shells while permitting relative longitudinal movement.

The bearing plate E includes a flat body portion 26 presenting an upper surface 27 in engagement with one end of the spring and an under surface 28 engaging the curved end 16 of the bell crank arm 11. The plate is formed with a circular centering portion 29 extending within the spring and serving to centralize the latter with respect to the plate.

Said plate E is reinforced with downwardly extending side flanges 30—30 which in co-operation with the body portion 29 combine to present a channel shaped section. The channel section so formed straddles the laterally extending portions of the bell crank levers B and serves to strengthen the body portion 26 of the plate.

Each shoe C—C adjacent the concave bearing 13 is each provided with lugs as indicated at 31 and 32 respectively, the latter being extended through an opening 33 formed adjacent the free end of the bell crank arm 10. Said lugs 31 and 32 are formed of relatively thin material and are deformed as indicated at 34 to bend over the section 12 of the lever and thereby retain the shoes and levers in definite pivotal relation with each other.

The curved surface 14 of each lever rests on a plane surface or flat plate which is conventionally indicated by a line 35 in Fig. 2 of the drawing. The bearing contact of the lever B on the plane surface 35 is preferably located immediately adjacent the center of the spring and the axial center of the section 12 lies outwardly from the said bearing contact location and thus the arms 10 of the said levers may be considered as struts with the line of thrust along inclined lines 36. The inclined relation of these so-called strut members is such that pressure applied in a lengthwise direction on the sections 12 increases the gripping action between the shoes and friction shell members as the shock absorber is compressed. As the pair of friction shells are contained within the coil spring, it will be understood that the lateral thrust of the shoes is finally taken by the spring and therefore the shell walls may be made of comparatively thin and cheap material.

In the operation of the shock absorber, when pressure is applied to compress the spring, the friction shells D—D by reason of the inclined surfaces 18 combine to present a wedge shaped member acting on the friction shoes E—E to force the shoes transversely inwardly towards each other. Compression of the spring thus induces a squeezing action on the shoes and this movement in turn is communicated to the bell crank levers which results in the upper ends of arms 10 being squeezed together. Relative approach of the upper ends of arms 10 of the levers results in an upward movement of the outer ends of the lateral arms 11 which forces the plate E upwardly and so compresses the spring from the lower end of the shock absorber.

During movement of the spring there is a slight rocking action of curve 14 on the plane surface 35 and also a slight sweeping contact between curved surface 18 of the arm 11 and the undersurface 28 of the plate E. The ever changing contacts made between the levers and their associated elements contribute in delaying the movement of the spring and thus avoids sudden and violent spring rebound such as occurs when the spring is free to oscillate freely.

The release of the device is the reverse operation to that above described as consequent on the expansion of the spring the pressure of the spring maintains the shoes in close frictional engagement with the shells and the parts are smoothly and gradually returned to normal position. The tapered relation between the interior and exterior surfaces of the shells prevent sticking of the shoes while still providing a retarding influence between the exterior of the shells and the spring.

In carrying out my invention, I prefer to make the bell crank levers from forgings and these lend themselves to drop forged members whereas the shoes and shells are preferably formed of malleable iron, the latter having the advantage of cheapness and lightness and are readily obtainable. In connection with the shoes, the ductility of malleable iron is advantageous in providing a material which will allow for deforming the retaining lugs without breaking.

My invention shows a preferred construction but it will be understood that the same is only by way of illustration and I contemplate all modifications which come within the scope of the claims appended hereto.

What I claim is:

1. In a shock absorber, a coiled helical spring; a friction shell having a body portion extending lengthwise of the spring and a shouldered section engaging one end of the spring; a pair of friction shoes in sliding engagement with the body portion of the shell; and a pair of bell crank levers each having one arm extending lengthwise of the body portion of the shell and having another arm extending laterally from the first mentioned arm; said first named arm pivotally engaging a friction shoe and said lateral arm being extended to engage with the end of the spring opposite to the shouldered section of the friction shell whereby the bell crank levers will force the shoes outwardly against the friction shell body portion on pressure being applied on the ends of the shock absorber.

2. In a shock absorber, a coiled helical spring; friction elements within the spring including friction shoes; means for spreading the shoes including a pair of bell crank levers each having a laterally extending arm projecting outwardly beyond the coil spring at one end thereof; and a plate interposed between the said lateral arms of the lever and the coil spring, said plate having its bearing contact outwardly beyond the outer circumference of the spring.

3. In a shock absorber, a coiled helical spring; oppositely movable friction elements mounted within the spring, one set of said friction elements consisting of a split shell having a body portion extending lengthwise within the spring and bearing against the inner circumference of the spring, said elements having a shouldered portion bearing against one end of the spring, said other set of friction elements including sliding shoes engaging the body portion of the friction shell and bell crank lever associated with the said shoes for forcing said shoes outwardly against the friction shell, each said bell crank lever having an arm pivotally associated with one of the shoes and having another arm extending laterally to underlie the spring and engage therewith; and a plate interposed between the said lateral arm and the spring, said plate having side reinforcing flanges straddling the lateral arms of the lever, said plate having a circularly shaped centering projection lying within the spring.

4. In a shock absorber, a coiled helical spring; oppositely extending friction elements extending within the spring, said respective sets of friction elements having portions engaging the opposite ends of the spring; one set of said elements including a split shell reacting against the inner surface of the coiled spring and the other set of said elements including friction shoes slidably engaging the friction shell elements and bell crank levers pivotally associated with the said shoes, each said bell crank lever having one arm extending laterally beyond the spring; and a bearing plate extending beyond the spring to engage the outer end of said laterally projecting portion of the lever, said plate being interposed between the spring and the lever.

5. In a shock absorber, a coiled spring; telescoping friction elements within the spring; said friction elements including a two part shell having a shouldered portion in engagement with one end of the spring and each having a body portion within the spring, said body portion being in the form of a segment of a circle; friction shoes slidingly engaging the friction shell; means for guiding the shoes relatively to the friction shell and preventing relative circular displacement of the shoes and friction shell while permitting lengthwise sliding movement, said means including lugs on the shoes engaging with the edge portions of the friction shell members; and means for forcing the shoes into engagement with the friction shell members, said means including a pair of bell crank levers, each having an arm engaging a shoe and having another arm reacting against the opposite end of the spring.

6. In a shock absorber, a coiled spring; a shouldered two part friction shell engaging one end of the spring and having a body portion extending lengthwise within the spring, said body portion having shoes in sliding engagement therewith, said body portion being in the form of a segment of a circle and having its outer surface bearing against the inner circumference of the spring; said surface of the shell engaging the shoe being slightly inclined to the axial center of the spring in a direction to cause relative squeezing of the shoes on compression of the spring; means resisting relative approachment of the pair of shoes, said means including bell crank levers each having an arm in pivotal engagement with a shoe and having another arm extending laterally to react against the end of the spring opposite to that engaged by the friction shell.

7. In a shock absorber, a coiled spring; a shouldered two part friction shell having the shoulder engaging an end of the spring and a body portion extending lengthwise within the spring, said body portion bearing against the inner face of the spring, a friction surface on each body portion, said friction surface extending lengthwise of the spring at a slight angle to the axial center of the spring whereby the friction surfaces of the two parts of the friction shell combine to present a flared pocket with its narrowest portion adjacent the shouldered part of the shell; friction shoes movable in the said pocket; and means for maintaining the shoes in close frictional contact with the shell and resisting relative transverse movement of said shoes as the shock absorber is compressed and the shoes are forced inwardly in the narrowing pocket, said means including a pair of bell crank levers each having an arm in pivotal association with one of the shoes and having another arm extended laterally to react against the end of the spring opposite to that engaged by the shouldered portion of the shell.

8. In a shock absorber, a coiled spring; a two part shouldered friction shell including a body portion within the spring and having the shouldered portion engaging one end of the spring; shoes in sliding engagement with the shell; means for forcing the shoes against the shell, said means including a pair of strut like members pivotally engaging at one end the shoes, and at the opposite end presenting a seat for one end of the shock absorber, said seats of the pair of struts being spaced inwardly laterally from the associated shoe pivots whereby pressure from the shoes to the seats will extend along lines inclined relatively to the axial center of the shock absorber; and lateral extensions from each strut engaging the end of the spring opposite to that engaged by the shouldered section of the shell.

GEORGE BINET DOREY.